United States Patent [19]

Blackwell

[11] 4,278,217
[45] Jul. 14, 1981

[54] FISHING REEL WITH AUTOMATIC VARIABLE DRAG

[76] Inventor: Roy N. Blackwell, 5716 Monterrey, Fort Worth, Tex. 76112

[21] Appl. No.: 60,592

[22] Filed: Jul. 25, 1979

Related U.S. Application Data

[63] Continuation-in-part of Ser. No. 965,682, Dec. 4, 1978, abandoned.

[51] Int. Cl.³ ............................................. A01K 89/02
[52] U.S. Cl. .................................... 242/217; 254/271
[58] Field of Search ............... 242/211, 212, 213, 214, 242/215, 216, 217, 218, 219, 220, 75.45, 75.53; 254/271, 270, 276

[56] References Cited

U.S. PATENT DOCUMENTS

| | | | |
|---|---|---|---|
| 2,588,525 | 3/1952 | Hertenstein | 242/76 |
| 2,592,595 | 4/1952 | Patterson | 242/75.45 |
| 2,813,601 | 11/1957 | De Bourgues | 242/75.53 |
| 3,101,828 | 8/1963 | Wilson | 254/276 |
| 3,166,269 | 1/1965 | Veroli | 242/217 |
| 3,246,859 | 4/1966 | Martin | 242/217 |
| 3,606,257 | 9/1971 | Wilson | 254/271 |

*Primary Examiner*—Billy S. Taylor
*Attorney, Agent, or Firm*—Peter J. Murphy

[57] ABSTRACT

A rotatable line storage spool is mounted transverse to the direction of line payout. A disengageable spool gear is associated with the spool, and a drive gear meshes with the spool gear. A drive mechanism and associated star drag mechanism includes an adjustable friction coupling between the crank drive shaft and the drive gear, the friction coupling being manually variable or adjustable by rotation of a star wheel. The drag mechanism includes an extension assembly, which functions as a spacer in the drag adjusting mechanism, and which is extended or contracted independently of the manual drag adjustment to provide a further drag control. The extension or contraction of this extension assembly is controlled by a follower arm bearing either against the spooled line or the line merging with the spool to detect the reeling radius, and coupled to the extension assembly. The applied drag torque is decreased in response to reduction of the reeling radius, and is increased in response to an increase in the reeling radius.

19 Claims, 8 Drawing Figures

FISHING REEL WITH AUTOMATIC VARIABLE DRAG

BACKGROUND AND SUMMARY OF THE INVENTION

This is a continuation-in-part of Application Ser. No. 965,682, filed Dec. 4, 1978, now abandoned.

This invention relates to a fishing reel providing a variable drag torque, responsive automatically to the reeling radius of the spooled line to maintain constant line tension.

Present day fishing reels, which incorporate externally adjustable mechanical friction-drag brakes, do not provide a mechanism for decreasing automatically the friction drag torque while the line is "paying out" during the process of "playing" or "fighting" a fish. As is most often the case, the manually adjustable drag, such as a "star drag" is adjusted to the desired line tension (less than the line rating) at or near the full spool condition, either prior to casting or at initial troll distance or bottom fishing depth. Many large fish are lost on the initial run, due to the fact that the initial drag torque setting remains approximately constant, between the full spool condition and a condition wherein a substantial amount of the spool line capacity has been payed out, with the result that the line tension increases drastically to above the line rating and ruptures. Depending upon the reel size, the line tension may increase by a factor of 2 to 5 between full spool and minimum spool conditions, as an inverse function of the decreasing spool line radius. This will be apparent from the relationship that the friction-drag-torque which restrains rotation of the spool is constant, while the torque which urges rotation of the spool is determined by the line tension multiplied by the reeling radius of the spooled line. It will be apparent, then, that as the reeling radius decreases, the force (line tension) required to overcome the friction-drag-torque must increase.

Possibly an experienced fisherman may compensate for this through adjustment of the manual drag; however, since the line tension may increase beyond rated capacity well before the full spool capacity is used, a wrong guess may result in the loss of a good fish along with a certain amount of tackle.

A primary object of this invention is to provide a reel having a mechanism for automatically reducing the spool drag torque as a function of decreasing line reeling radius, and for automatically increasing the spool drag torque as a function of increasing line reeling radius to maintain substantially constant line tension and thereby prevent excessive line tension.

Another object of this invention is to provide such mechanism for automatically increasing and decreasing the spool drag torque, which mechanism operates independently of and complementary to a mechanism for manually adjusting the spool drag torque.

A further object of this invention is to provide such mechanism including a swinging follower arm bearing on the spooled line to control the mechanism, and means for automatically disengaging the follower arm from the spooled line in conjunction with the free spool condition of the reel.

Still another object of this invention is to provide such mechanism including a swinging follower arm bearing on the tensioned line immediately adjacent to the spool to control the mechanism.

A still further object of this invention is to provide such mechanism which is responsive to the reeling radius of the line, whether or not the reel includes a level wind mechanism.

A further object of this invention is to provide such mechanism which is effective, which is relatively simple and rugged in design, and which is therefore reliable for the intended purpose.

These objects are accomplished in a fishing reel having a housing, and having a spool and associated drive gear rotatably mounted in the housing. A variable drag mechanism for the spool comprises the following elements. A friction mechanism is provided for producing a variable friction drive on the drive gear. A detecting means is provided for detecting the reeling radius of the spooled line, reeling on or off the spool. A coupling means couples the detecting means to the friction mechanism, to effect reduction of the friction applied to the drive gear in relation to a decrease in the reeling radius, and to effect an increase in the friction applied to the drive gear in relation to an increase in the reeling radius.

More particularly, in one embodiment a follower arm is pivotally mounted on the housing for engagement with the spooled line; and spring means urges the follower arm into engagement with the line. In another embodiment, a follower arm is pivotally mounted on the housing for engagement with the tensioned line adjacent to the point of merging with the spooled line; and spring means urges this follower arm against the line in opposition to the resistance provided by the tensioned line.

The novel features and the advantages of the invention, as well as additional objects thereof, will be understood more fully from the following description when read in connection with the accompanying drawing.

DRAWING

DESCRIPTION OF THE PREFERRED EMBODIMENTS

Figure 1:
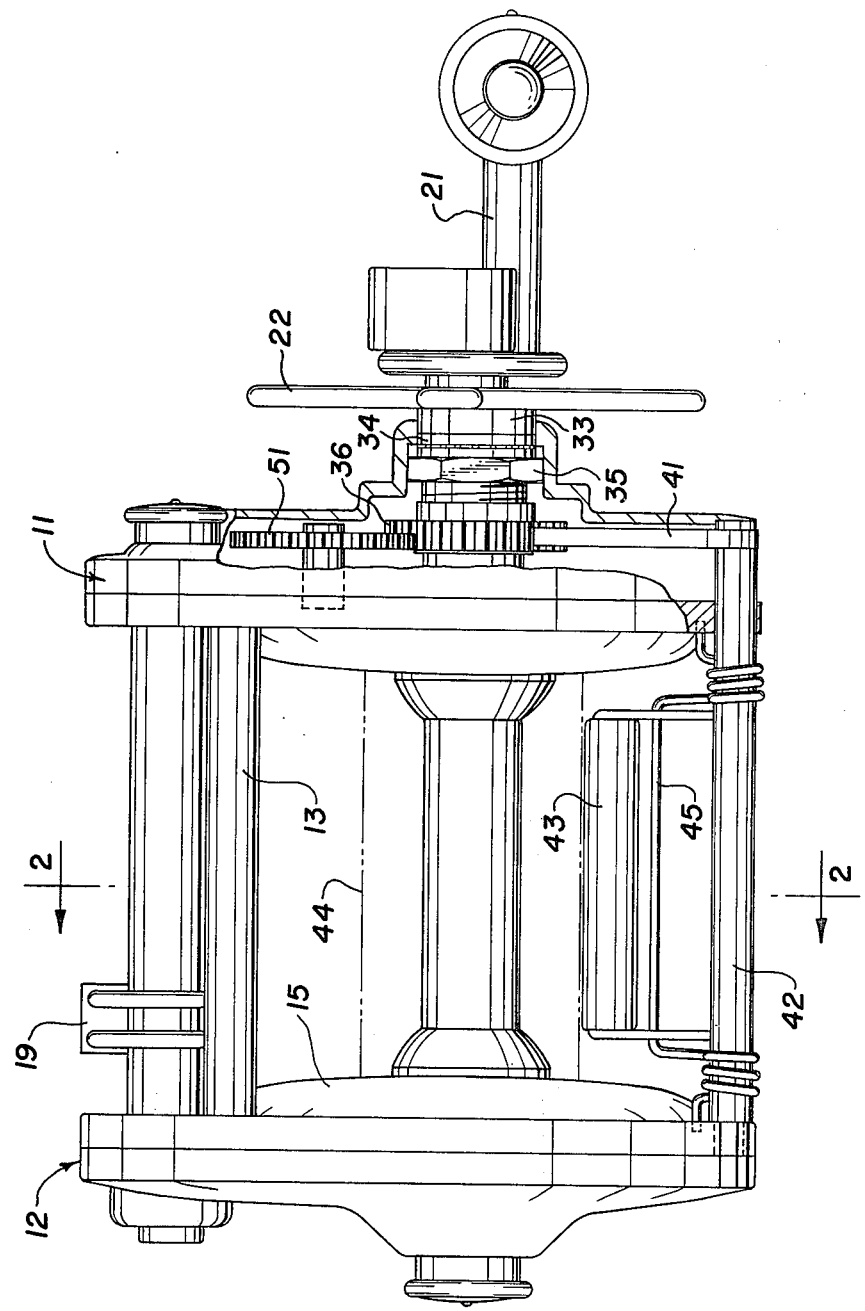
FIG. 1 is a plan view of a reel according to the invention, partially broken away to show the drive mechanism.
Figure 2:
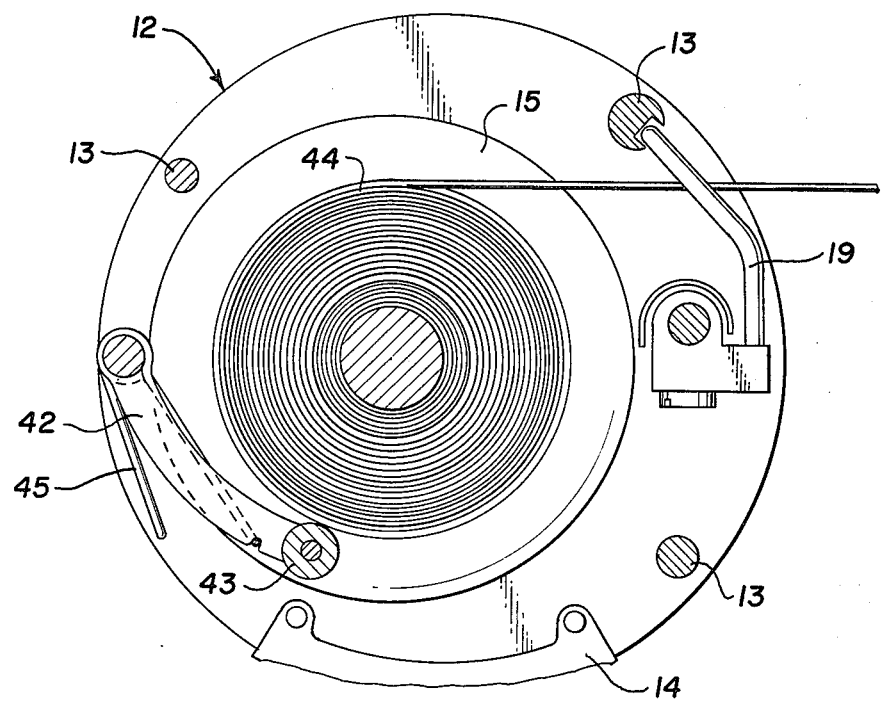
FIG. 2 is a transverse sectional view taken along the line 2—2 of FIG. 1.
Figure 4:
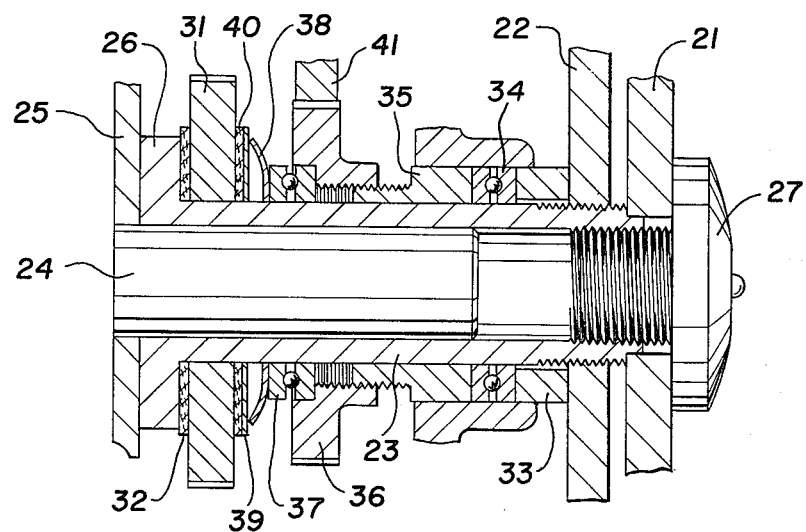
FIG. 4 is an enlarged and separated, detail sectional view of the drive and drag mechanisms illustrated in FIG. 3.
Figure 3:
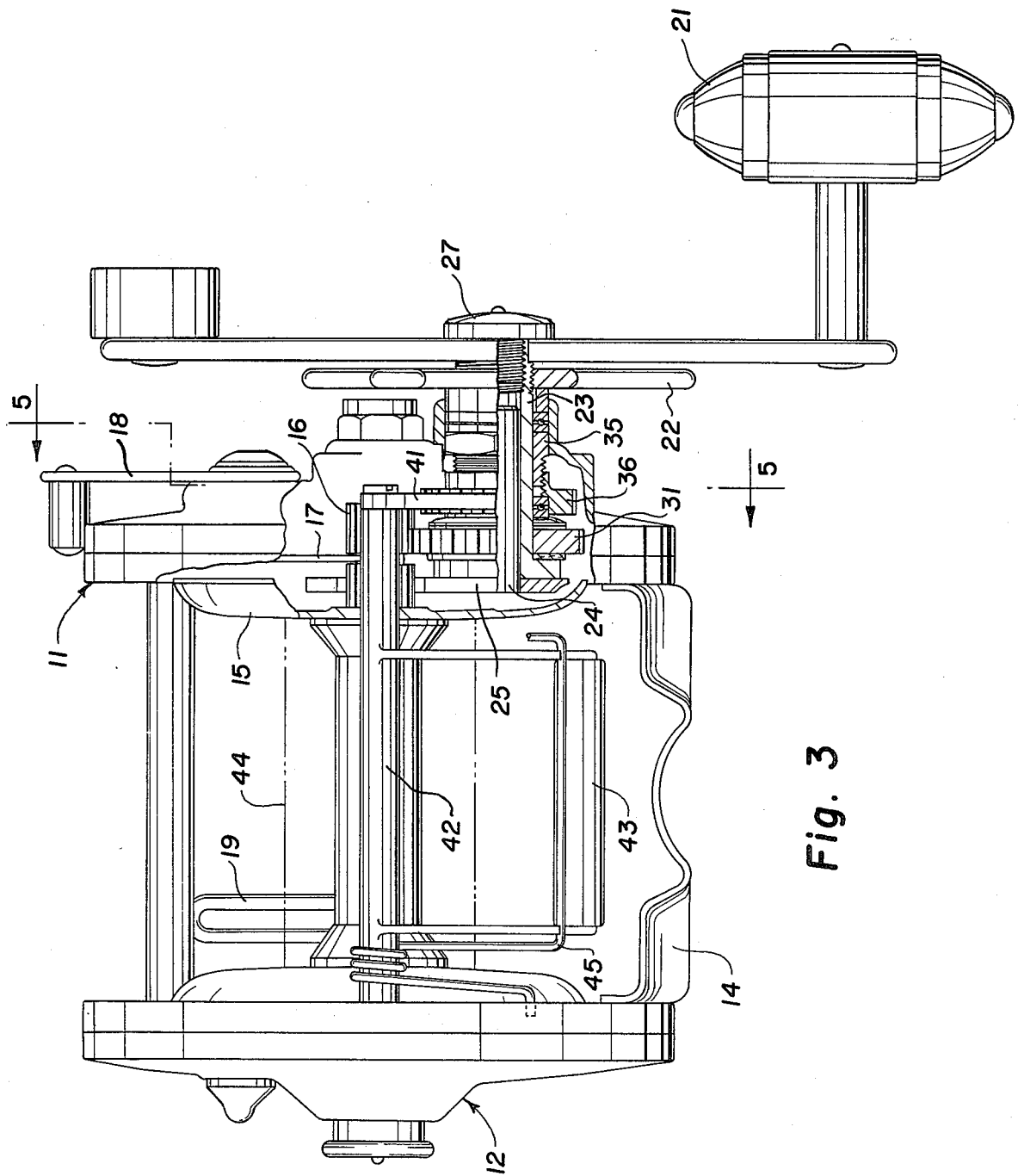
FIG. 3 is a rear elevation view, partially broken away, of the reel of FIG. 1.

In the following specification, two embodiments of the invention are described in reels having generally the same construction; and common reference numbers will be used to identify the common parts of the reels in the two embodiments.

The term "reeling radius", as used in this specification, refers to the radius of the spooled line at the point where it is reeled off or reeled onto the spool. In one embodiment, in which the reel includes a level wind mechanism, the radius of the line over the length of the spool is quite uniform; and accordingly an arm which detects the spooled line radius at any particular time will inherently detect the reeling radius of the line at a particular instant. On the other hand, where a reel is not provided with a level wind mechanism, the winding of the line over the length of the spool is likely not uniform with ridges and valleys being formed. With this circumstance, a mechanism which seeks to detect the spooled line radius by bearing on the spool would detect the radius of the largest ridge; whereas the line being wound onto or off the spool at a particular instant may be lying in a valley having a significantly smaller reeling radius. This may possibly create undesirable inaccuracy in the system; and to obviate this problem the second embodiment detects the reeling radius by responding to the tensioned line a short distance from the point of merging with the spool.

EMBODIMENT I—FIGS. 1 THROUGH 5

FIGS. 1 through 5 illustrate a salt water type reel 10 which is provided with a manually adjustable drag mechanism, commonly known as a "star drag".

In general structure, the reel housing includes portions referred to as a head plate 11 and a tail plate 12, interconnected and spaced by spacer bars 13. A mounting bracket 14 is connected between the head and tail plates for securing the reel to a fishing rod in the usual manner. A spool 15 is rotatably mounted between the head and tail plates; and an associated spool gear 16 is mounted coaxially with the spool, within the head plate 11. The spool gear and spool include coacting coupling means (not shown); and the spool gear is shiftable axially relative to the spool, to engage and disengage the coupling means to effect either a free spool condition or driving engagement with the drive mechanism and drag mechanisms to be described. The spool gear is shifted axially by means of a yoke 17 mechanically coupled to a free spool control lever 18.

The reel is provided with a conventional level wind mechanism, including a traversing guide arm 19; the level wind mechanism being coupled to the spool by means not shown. While a level wind mechanism is not essential to this embodiment of the invention, such level wind mechanism is desirable.

The spool wind or drive mechanism includes a crank 21 and associated mechanism, to be described, for coupling the crank to the spool gear 16. The star drag mechanism is associated with this drive mechanism; and includes a star wheel 22 positioned axially adjacent to the crank 21, and rotatable by the user to adjust the manual drag.

Referring to the drive mechanism in detail, this includes a hollow drive shaft 23 journaled on a post 24, which post is fixed to a plate 25 being a portion of the head plate 11. The drive shaft is provided with a radially outward extending drive flange 26 at its inner end; and is configured at its outer end to receive the crank 21 in driving relation. The crank is secured to the shaft by means of a cap screw 27. The drive shaft 23 is externally threaded, adjacent to its outer end, to receive the star wheel 22 which has complementary internal threads.

A drive gear 31 is rotatably mounted on the drive shaft 23, in driving relation with the spool gear 16; and is separated from the drive flange 26 by a friction drive disk 32. This friction drive disk, along with friction drive disk 40, provides a friction drive coupling between the drive shaft and the drive gear; and the friction coupling is controlled by the drag mechanism now to be described, including both the manually adjustable star drag and an associated automatically adjustable drag which is responsive to the radius of the line on the spool 15.

The star drag mechanism includes the following annular elements which are rotatably mounted on the drive shaft 23, and stacked in the following order between the star wheel 22 to the drive gear 31: an annular spacer 33; a thrugh bearing 34; a drag sleeve 35 and drag gear 36, functioning together as another spacer in the star drag mechanism; a thrush bearing 37; a Belville spring 38; a nonrotatable bearing washer 39; and another friction disk 40. The drive shaft 23 is flatted and the bearing washer 39 is correspondingly flatted and nonrotatable relative to the drive shaft. It will be seen that clockwise rotation of the star wheel moves this assembly to the left in FIG. 3 and FIG. 4 toward the drive flange 26, compressing the spring 38 to increase the frictional drag torque effective between the drive shaft and the drive gear. Conversely, counterclockwise rotation reduces the drag torque. The star wheel is readily rotated, relative to the shaft and crank, by the user.

Reversible counterclockwise rotation of the drive shaft is prevented (by means not shown) so that the above described friction drive coupling retards rotation of the drive gear and spool placing the desired amount of drag on the spool. This also enables manual adjustment of the drag by rotation of the star wheel while line is being rapidly paid out.

It will be seen that the above mentioned assembly of drag sleeve 35 and drag gear 36, which functions as a spacer in the star drag mechanism, may function also as an extension assembly for increasing or decreasing the frictional drive or drag torque between the drive flange and drive gear. This is accomplished by the fact that the drag sleeve 35 is provided with a hex head which is nonrotatably confined within the head plate structure 11, with the drag gear 36 being rotatable relative to the housing and to the drag sleeve. It will be seen that this extension assembly may be controlled independently of the star drag, but is also complementary to the star drag in the sense of increasing or decreasing the drag which has been set manually by the star wheel.

The drag gear is rotated by an actuator gear 41, in the form of a gear segment, and which is nonrotatably fixed to an actuator shaft portion of a follower arm 42. The follower arm is pivotally mounted between the head and tail plates, parallel to the spool axis, and includes radially projecting arms carrying a roller 43 which bears against the line 44 wound on the spool. A spring 45 urges rotation of the arm in a direction to urge the roller toward the spool core. The swing of the follower arm may be 30° for example; and the lead and hand of the threads of the drag sleeve and drag gear, and the gear ratio between the drag gear and the actuator gear may be selected to provide the desired increase or decrease in the friction drag torque relative to the follower arm swing.

Figure 5:
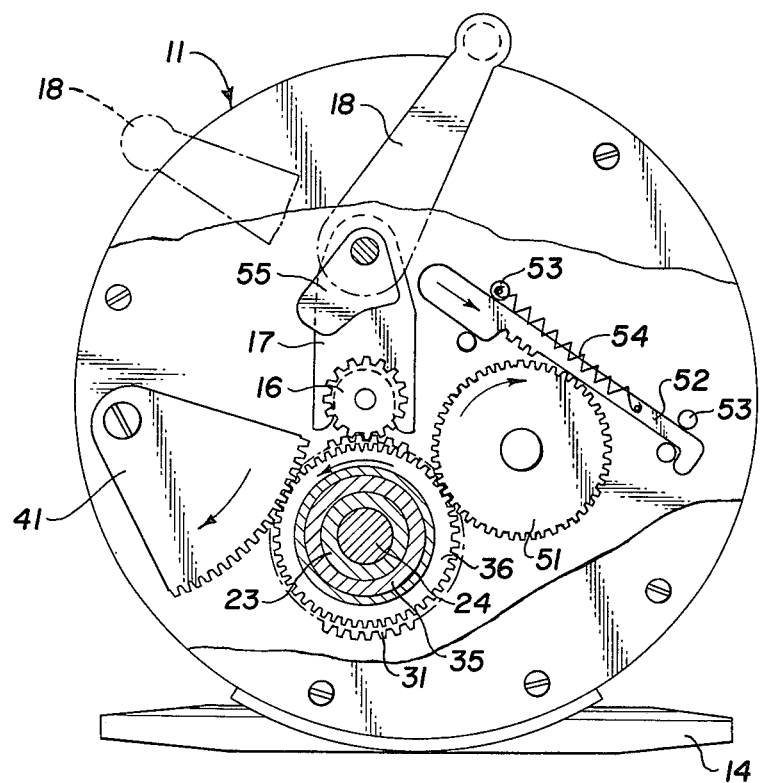
FIG. 5 is a partial end view and sectional view taken along the line 5—5 of FIG. 3.

To allow for complete free spooling of the spool 15, a mechanism is provided for lifting the follower arm 42 from the line on the spool, simultaneously with the disengagement of the spool from the drive mechanism. As mentioned above, the spool is disengaged from the drive mechanism by axial shifting of the spool gear 16 by means of the control lever 18 which is shown in the spool drive position in the drawings, particularly in FIG. 5. As best seen in FIG. 5, the mechanism for lifting the follower arm 42 from the spool includes an idler gear 51 meshing with the drag gear 36, and an elongated rack arm 52 guided for rectilinear movement in the head plate 11 by guide pins 53. The rack arm includes teeth which are held out of engagement with the idler gear 51 in the normal drive condition of the reel, the rack arm being urged to this normal condition illustrated in FIG. 5 by a spring 54. A cam 55 is nonrotatably fixed to the control lever 18, and positioned such that when the control lever is moved to the free spool position, indicated in the broken lines in FIG. 5, the cam engages and shifts the rack arm 52 to engage the rack arm teeth with the idler gear. This effects movement of the rack arm, idler gear, drag gear, and actuator gear in the directions indicated by the arrows, in FIG. 5, to rotate the follower arm a few degrees sufficient to lift the follower arm from the line on the spool. It will be seen that, regardless of the position of the follower arm at the time the free spool control lever 18 is actuated, the follower arm will only be rotated a few degrees from the then existing position which is all that is required for the free spool condition.

With the return of the free spool control lever to the normal position, the rack arm 52 will be returned by the spring 54 to the illustrated limit position, to allow normal operation of the automatic adjustable drag mechanism controlled by the follower arm.

OPERATION OF EMBODIMENT I

Referring briefly to the operation of the above described fishing reel, when the free spool release lever 18 is moved to the broken line position illustrated in FIG. 5, the spool gear 16 is moved axially out of engagement with the spool, and the follower arm 42 is lifted out of engagement with the line on the spool so that the spool is in a complete free spool condition for casting.

In the normal position of the free spool release lever 18, the spool gear is urged into driving engagement with the spool and is, of course, in engagement with the drive gear 31. The follower arm is released to allow its roller 43 to be urged into engagement with the line 44 on the spool by the spring 45.

Prior to casting, a selected drag on the spool may be set manually by rotation of the star wheel 22. During the cast, and otherwise during payout of the line, the follower arm will follow the reducing radius of the line 44 on the spool; and this effects rotation of the drag gear 36 to decrease automatically the drag on the drive gear 31 in relation to the decreasing spool radius, to effectively maintain a constant tension or retarding force on the line 44. Should the preset drag be incorrect, further adjustment may be made manually by means of the star wheel; and the newly set drag will be maintained by the automatic mechanism. Conversely, as line is taken up on the spool through the crank 21, the drag on the drive gear will be automatically increased in relation to the increasing radius of the line on the spool.

EMBODIMENT II—FIGS. 6 THROUGH 8

Figure 6:
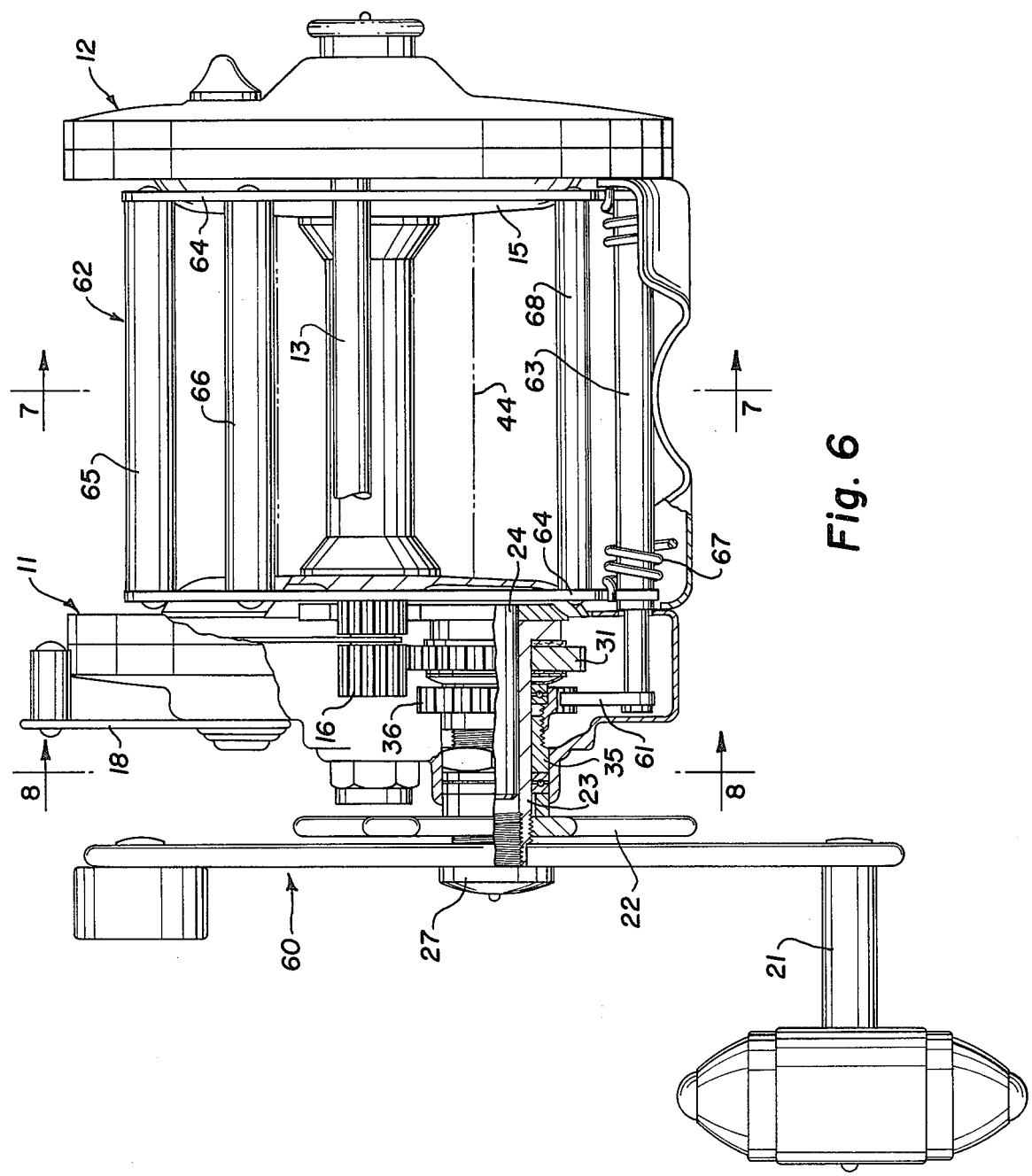
FIG. 6 is a front elevation view, partially broken away, of a reel similar to the reel of FIGS. 1 and 3 embodying a modified form of automatic variable drag according to the invention.
Figure 7:
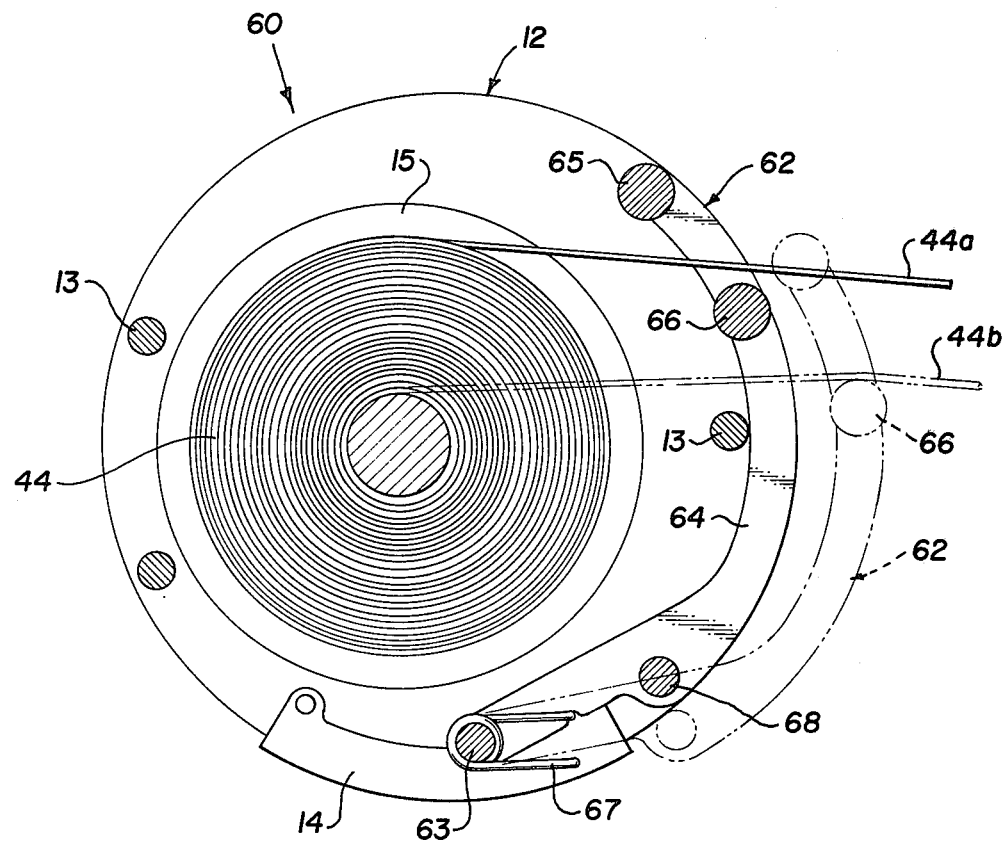
FIG. 7 is a transverse sectional view taken along the line 7—7 of FIG. 6.
Figure 8:
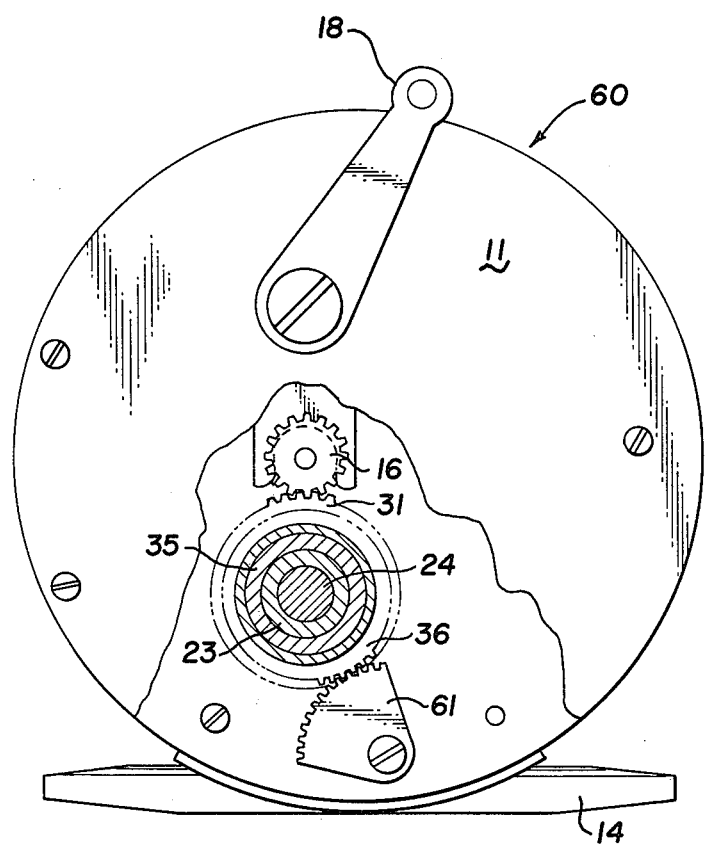
FIG. 8 is a partial side view and partial transverse sectional view of the reel of FIG. 6, as viewed along the line 8—8 of FIG. 6.

The basic structure of the reel 60 illustrated in FIGS. 6 through 8 is identical to the above described reel, as also are certain structural details. This reel 60, however, is not provided with a level wind mechanism. In order to make the variable drag mechanism more precisely responsive to the reeling radius, the follower arm is designed to bear against the line adjacent to its point of merging with the spooled line. Reference herein to "merging line", refers to the line adjacent to the spool and which is merging with the spooled line, either paying out from the spool or being reeled onto the spool. The "merging line path" is the path of the merging line in the area adjacent to the reel. This path, when the line is under tension, is a straight line path between the reel spool and the first line guide eye, which is a part of the rod; and this path will converge with the rod, the angle of convergence being larger when the spool is full and becoming smaller as the line is paid out from the spool. As best seen in FIG. 7, this path then displaces laterally toward the rod from the full spool condition illustrated by the line 44a to the empty spool condition illustrated by the line 44b.

In general structure, the reel housing for this reel includes the head plate 11 and tail plate 12 interconnected and spaced by spacer bars 13, and a mounting bracket 14.

A spool 15 is rotatably mounted between the head and tail plates. The spool 15 is driven by a coaxially mounted and axially shiftable spool gear 16, which is shifted by the control lever 18 and associated yoke 17 between the drive and free spool conditions.

The spool wind or drive mechanism, including the crank 21, and the star drag mechanism, including the star wheel 22, are identical to that previously described. Similarly, the assembly of the drag sleeve 35 and drag gear 36, which functions as a spacer in the star drag mechanism and also functions as an extension assembly for increasing or decreasing the frictional drive or drive torque between the drive flange 26 and drive gear 31, is identical to the mechanisms previously described. In this reel 60, however, the mechanism for rotating the drag gear 36 differs; and that mechanism will now be described.

The drive gear 36 is rotated by an actuator gear 61, in the form of a gear segment, and which is nonrotatably fixed to an actuator shaft portion 63 of a follower arm 62. The follower arm is pivotally mounted between the head and tail plates, and includes parallel projecting side arms 64 nonrotatably fixed to the shaft portion 63. These arms support a distal bearing bar 65, between the distal ends of the arms 64, and a proximal bearing bar 66 which is spaced from the distal bar; the bearing bars being parallel to the shaft 63 and defining with the side arms a window for guiding the merging line. An additional stiffener bar 68 connects the side arms 64 adjacent to the shaft 63. If desired, to minimize line wear, rollers mounted on frictionless bearings may be substituted for the bearing bars.

The follower arm 62 is normally urged to a limiting position, illustrated by the full line position in FIG. 7, by means of a spring 67. In this limiting position, as seen in FIGS. 6 and 7, the window is disposed at the front of the reel in position to pass the merging line 44a from the spool, without interference with the merging line path in the full spool condition. As seen, the window is coextensive in width with the width of the spool 15; and is provided to prevent the line from becoming entangled during use of the reel.

The window is disposed to be free from interference with the merging line 44a, in the full spool condition of the reel, to allow the line to payout freely when the reel is in the free spool condition for the initial cast. It is only after an amount of line has been paid out on the initial cast, that the merging line path will bring the line into engagement with the proximal bearing bar 66. As illustrated by the line 44b in FIG. 7, the merging line being placed in tension either by the action of the fish withdrawing the line from the spool under drag, or by the action of the user reeling in the line resisted by the fish, exerts a force acting downward on the proximal bearing bar and this acts to rotate the follower arm 62 clockwise about its shaft 63. This movement of the follower arm of course rotates the drag gear 36 to effect relaxation of the drag acting on the spool. The force of the spring 67 is adjusted to provide suitable response of the follower arm to the force exerted by the tensioned line. When the tension on the line relaxes, the spring will return the follower arm to the limit position. At any time that the line is tensioned, the follower arm will respond and automatically adjust the drag mechanism in relation to the extant reeling radius.

OPERATION OF EMBODIMENT II

For the reel 60, described as Embodiment II, there is no mechanical relation between the free spool mechanism and the follower arm control mechanism for the automatic drag. The free spool release mechanism is conventional, and simply releases the spool from the drag or drive mechanism. As mentioned, the follower arm control is disposed so as not to interfere with the line in the free spool condition.

During operation of the reel, the follower arm 62 responds to the instantaneous reeling radius of the line at any time that the line is under sufficient tension, and automatically adjusts the drag mechanism to limit the maximum tension which will be applied to the line for any reeling radius of the merging line. If desired, the bearing bars 45 and 46 may be formed as rollers to minimize wear of the line.

What has been described in a novel fishing reel which includes a conventional manually adjustable star drag mechanism for varying or adjusting the friction drive and drag torque between the crank and the spool drive gear, which serves as the drive coupling for the spool and as the drag for the spool during line payout; and which includes an automatic adjustment for the drag torque which functions in response to the changing reeling radius of the spooled line and which, in effect, modifies the drag torque set by the manual adjustment. This automatic adjustment maintains relatively constant line tension during the playing of a fish, regardless of the reeling radius of the spooled line, and prevents the tension from increasing to a point in excess of line rating resulting from decreasing reeling radius. This enables the fisherman to utilize all of the line stored on his spool without danger of losing the line because the tension has exceeded the line rating.

A feature of one embodiment of the invention is that the control follower arm, which necessarily bears on the line wound on the spool, is automatically disengaged from the spooled line for the free spool condition of the reel, so that a true free spool condition is achieved.

A feature of another embodiment of the invention is that the control follower arm detects the tension on the line merging with the spool and responds, accordingly to the instantaneous reeling radius of the line.

Another feature of the invention is that the mechanism for accomplishing these objects is relatively simple, rugged, and effective.

While the preferred embodiment of the invention has been illustrated and described, it will be understood by those skilled in the art that changes and modifications may be resorted to without departing from the spirit and scope of the invention.

What is claimed is:

1. In a fishing reel having a housing, and having a spool and associated spool gear rotatably mounted in said housing; a variable drag mechanism for said spool, responsive to the diameter of line on said spool, said mechanism comprising:
   a drive gear rotatably mounted in said housing in driving relation with said spool gear;
   a friction mechanism for producing variable friction drag on said drive gear;
   a follower arm pivotally mounted on said housing for engagement with the line wound on said spool; means urging said follower arm into engagement with the line on said spool;
   and means coupling said follower arm to said friction mechanism to effect reduction of the friction applied to said drive gear in relation to a decrease in the diameter of the line on said spool, and to effect increase of the friction applied to said drive gear in relation to an increase in the diameter of the line on said spool.

2. A fishing reel as set forth in claim 1
   said follower arm comprising a shaft portion pivotally mounted about an axis parallel to the spool axis, and a radial arm portion for engagement with said line; and an actuator member nonrotatably mounted on said follower arm shaft portion for coupling to said friction mechanism.

3. A fishing reel as set forth in claim 2
   said friction mechanism including a rotatable member threadedly mounted on a fixed threaded member, said rotatable threaded member advancing and retracting axially to vary the friction drag applied to said drive gear; and said actuator member being coupled to said rotatable threaded member to effect rotation thereof.

4. A fishing reel as set forth in claim 3
   said rotatable threaded member comprising a gear; and said actuator member comprising an actuator gear for driving said first named gear.

5. In a fishing reel having a housing, and having a spool and associated spool gear rotatably mounted in said housing; a variable drag mechanism for said spool, responsive to the diameter of line on said spool, said mechanism comprising:
   a drive gear rotatably mounted in said housing in driving relation with said spool gear;
   means for producing variable friction drag on said drive gear comprising an extension assembly, friction means, and spring means mounted coaxially with said drive gear; said extension assembly and spring means varying the force of said friction means applied to said drive gear; said extension assembly comprising a threaded shaft, restrained against rotation in said housing, and a drag gear threaded onto said threaded shaft;
   a follower arm pivotally mounted on said housing for engagement with the line wound on said spool; means urging said follower arm into engagement with the line on said spool; an actuator gear rotatably mounted in driving relation with said drag gear; and means coupling said follower arm and said actuator gear in driving relation;
   said coacting shaft and drag gear of said extension assembly having a lead and hand selected to retract said extension assembly, and thereby reduce the friction applied to said drive gear, in relation to the decreasing diameter of the line on said spool.

6. A fishing reel as set forth in claim 5
said means for producing variable friction drag including a drive shaft having a driving flange at one end and a crank fixed to the other end of said shaft; means for preventing rotation of said shaft in one direction;
said drive gear, said extension assembly, said friction means and said spring means being coaxially and rotatably mounted on said drive shaft, with said friction means disposed between said drive shaft flange and said drive gear; and said extension assembly and said spring means varying the friction coupling between said drive shaft flange and said drive gear.

7. A fishing reel as set forth in claim 6
said follower arm comprising a shaft portion pivotally mounted about an axis parallel to the spool axis, and a radial arm portion for engagement with said line; and said actuator gear being nonrotatably mounted on said follower arm shaft portion;
and spring means normally urging said radial arm portion into engagement with the line on said spool.

8. A fishing reel as set forth in claim 7
said spool gear being shiftable axially relative to said spool; said spool and spool gear having coacting engageable and disengageable coupling means responsive to the axial shifting of said spool gear; lever means for effecting the axial shifting of said spool gear; and means coupling said lever means to said follower arm to disengage said follower arm from said line wherein said spool gear is disengaged from said spool.

9. A fishing reel as set forth in claim 6
said drive shaft being externally threaded at its end remote from said drive shaft flange; star wheel means threadedly mounted on said drive shaft threads; and said extension assembly and said spring means being disposed between said drive gear and said star wheel means to define, with said star wheel means, a manually adjustable drag mechanism for said drive gear.

10. A fishing reel as set forth in claim 5
a level wind mechanism coupled to said spool for distributing the line uniformly on said spool.

11. A fishing reel as set forth in claim 5
said means for producing variable friction drag on said drive means comprising manual means for shifting said extension assembly axially to vary the force of said friction means applied to said drive gear; said extension assembly functioning as a spacer between said manual adjustment means and said spring means.

12. In a fishing reel having a housing, a spool and associated drive gear rotatably mounted in said housing, and a friction mechanism for producing variable friction drag on said drive gear;
means for detecting the reeling radius of the spooled line reeling on or off said spool; said detecting means comprising a follower arm pivotally mounted on said housing for engagement with the line reeling off or onto said spool; means urging said follower arm into engagement with said line, whereby said arm pivots in response to change in the reeling radius of said spooled line;
said friction mechanism including an extension assembly of a rotatable threaded member threadedly mounted on a rotatably fixed threaded member, said rotatable threaded member advancing and retracting axially to vary the friction drag applied to said drive gear;
means coupling said detecting means to said friction mechanism, to effect reduction of the friction applied to said drive gear in relation to a decrease in said reeling radius, and to effect increase of the friction applied to said drive gear in relation to an increase in said reeling radius;
and said coupling means coupling said follower arm to said rotatable threaded member, to effect rotation of said rotatable member in response to pivotal movement of said follower arm.

13. A fishing reel as set forth in claim 12
said rotatable threaded member including gear means; and said follower arm including a pivot shaft, and associated gear means nonrotatably mounted on said pivot shaft and coupled in driving relation to said rotatable threaded member gear means.

14. A fishing reel as set forth in claim 12
said friction mechanism including manual means for shifting said extension assembly axially to vary the friction drag applied to said drive gear; said extension assembly functioning as a spacer between said manual shifting means and said drive gear.

15. A fishing reel as set forth in claim 12
said friction mechanism including an axially stacked assembly of a friction member bearing on said drive gear, spring means urging said drive gear and said friction member into frictional engagement, said extension assembly, and manual means for shifting said extension assembly axially relative to said drive gear to provide manual adjustment of the friction drag on said drive gear.

16. A fishing reel as set forth in claim 15
said friction mechanism including a drive shaft having driving flange at one end and a crank fixed to the other end of said shaft; means for preventing rotation of said shaft in one direction; said drive gear, said extension assembly, said friction member and said spring means being coaxially and rotatably mounted on said drive shaft, with said friction member disposed between said drive shaft flange; said friction mechanism varying the friction coupling between said drive shaft flange and said drive gear.

17. A fishing reel as set forth in claim 12
said follower arm having means defining a yoke disposed adjacent to said spool for confining the line merging with said spool; said yoke including a transverse bearing bar disposed parallel to the pivot axis of said arm;
said urging means urging said bearing bar to a position adjacent the line merging with said spool at the full spool condition, with said bearing bar disposed to be engaged by said merging line at conditions of less-than-full spool condition;
said merging line effecting the pivoting of said arm against the force of said urging means, as said reeling radius decreases.

18. A fishing reel as set forth in claim 17
said follower arm yoke including means defining a guide window; said guide window including said first named bearing bar, defining a proximal bearing bar, and a distal bearing bar, both disposed parallel to the pivot axis of said arm; said window means including side members corresponding in width to the length of said spool; and said window serving to confine the line reeling off or onto said spool, to prevent entanglement with said follower arm.

19. A fishing reel as set forth in claim 12 said detecting means comprising a follower arm pivotally mounted on said housing for engagement with the spooled line; and means urging said follower arm into engagement with said spooled line.

* * * * *